United States Patent [19]

Sanada

[11] Patent Number: 4,542,651
[45] Date of Patent: Sep. 24, 1985

[54] RECIPROCATING PISTON FLOW METER WITH A FLUID BYPASS

[75] Inventor: Makoto Sanada, Tokorozawa, Japan

[73] Assignee: Honda Giken Kogyo Kabushiki Kaisha, Tokyo, Japan

[21] Appl. No.: 474,189

[22] Filed: Mar. 10, 1983

[51] Int. Cl.$^4$ .............................................. G01F 3/14
[52] U.S. Cl. .................................................... 73/250
[58] Field of Search ................ 73/239, 249, 250, 251, 73/223

[56] References Cited

U.S. PATENT DOCUMENTS

| | | | |
|---|---|---|---|
| 1,799,875 | 4/1931 | Thompson | 73/239 |
| 3,657,925 | 4/1972 | Gross | 73/239 |
| 4,096,747 | 6/1978 | Gilson | 73/251 |
| 4,362,052 | 12/1982 | Heath et al. | 73/239 X |

FOREIGN PATENT DOCUMENTS 151218 11/1980 Japan ..................................... 73/239

Primary Examiner—James L. Rowland
Assistant Examiner—Brian R. Tumm
Attorney, Agent, or Firm—Armstrong, Nikaido, Marmelstein & Kubovcik

[57] ABSTRACT

A slow flow meter having a free piston slideably mounted in a cylinder with a non-contact type detector measuring movement of the same. A bypass is provided between fluid inflow and outflow pipes connected to opposite ends of the cylinder. A forcible returning device is operatively associated with the bypass controller to return the free piston to its original position after measurement.

4 Claims, 10 Drawing Figures

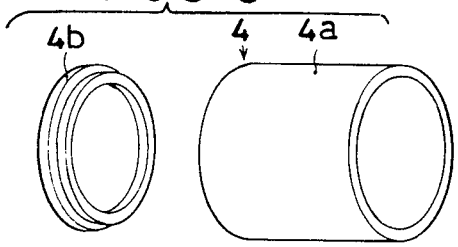
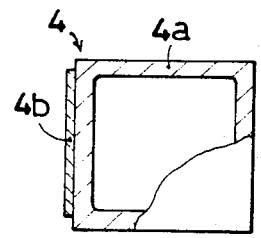
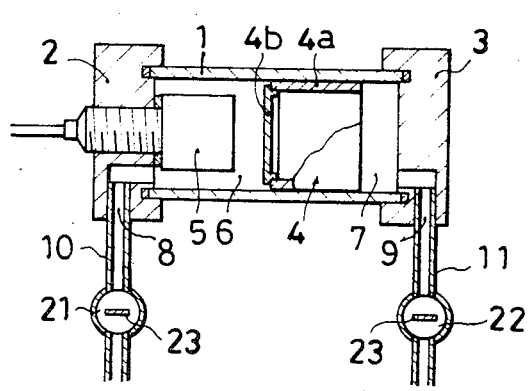
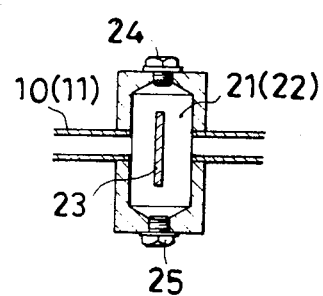
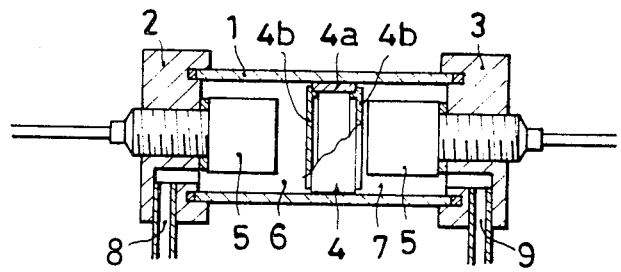
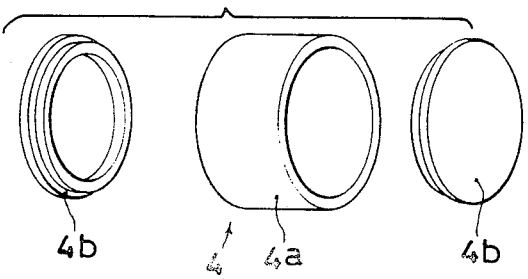

RECIPROCATING PISTON FLOW METER WITH A FLUID BYPASS

This invention relates to a flow meter wherein the amount of displacement of a free piston movement in a cylinder resulting from supplying fluid thereinto is detected by a noncontact type detecting means to measure the flow rate of the fluid.

This free piston type flow meter is suitable for measuring a very small flow rate because the meter is highly sensitive. This invention has for its object to provide an improved flow meter of this type wherein a free piston thereof is returned to its measuring starting position immediately after the completion of a flow rate of fluid, so that an improvement in the measuring efficiency thereof results. Namely, it is the gist of this invention that there is provided a bypass connecting between fluid inflow and outflow pipes which are connected to both end portions of a cylinder, and there is additionally provided such a forcibly returning means for returning the free piston to its original position that the same is operated simultaneously with opening of the foregoing bypass after the completion of an advancing stroke of the free piston.

The above and other objects and the attendant advantages of the present invention will become readily apparent by reference to the following detailed description when considered in conjuction with the accompanying drawings wherein:

FIG. 5 is an exploded perspective view of a free piston used for any of the above embodiments thereof;

FIG. 6 is a side view, partly in section, of a modified example of the free piston;

FIG. 7 is a sectional side view of another modified example of this invention;

FIG. 8 is an enlarged sectional view of a part thereof;

FIG. 9 is a sectional side view of further another modified example of this invention, and FIG. 10 is an exploded perspective view of a free piston used for the example in FIG. 9.

Figure 1:
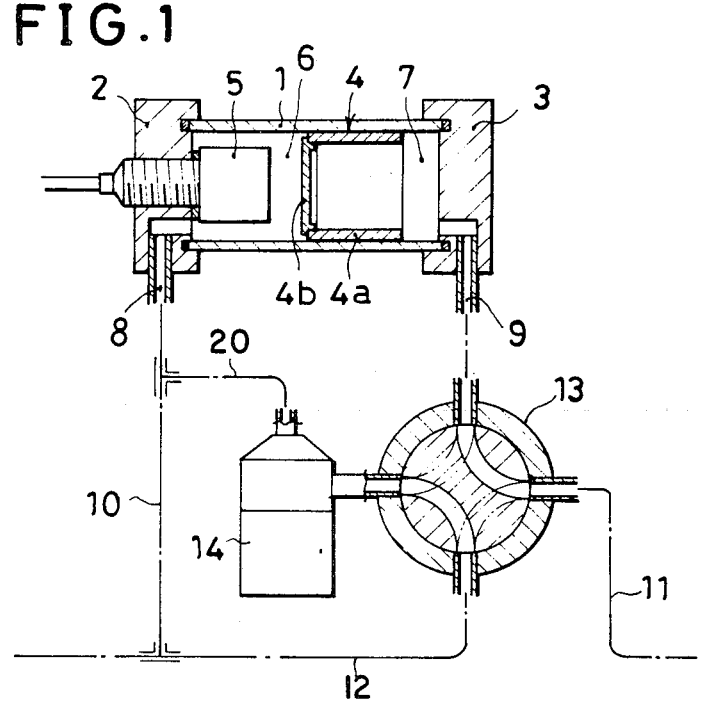
FIG. 1 is a sectional side view of a first embodiment of this invention.

Embodying examples of this invention will now be explained with reference to the acompanying drawings:

Referring to FIG. 1 showing one example thereof, a cylinder 1 made of a non-conducting material such as transparent glass or the like, has both end openings closed by closure members 2, 3. A free piston 4 is arranged to be slideably moved along and in the cylinder 1. The free piston 4 is constructed having an end plate 4b made of a conductive material such as aluminum or the like which serves as a member to be detected. End plate 4b is fixedly mounted under pressure in or bonded to one end opening of a tubular body 4a made of a nonconducting material such as glass, ceramics, synthetic resin or the like. FIG. 5 shows an exploded perspective view thereof. A piston 4 with this construction is advantageous in that the same is small in weight and has a high degree precision of a sliding surface thereof in relation to the cylinder 1. As a result, the flow meter is heightened in its sensitivity. The piston 4 may be a closed hollow with both end openings of the tubular body closed by end plates. Furthermore, the piston 4 may be constructed, as shown clearly in FIG. 6, for instance, such that the tubular body 4a has both its end wall portions formed intergrally therewith as a molding to form a closed hollow body made of non-conducting material. The end plate 4b serving as a member to be detected is affixed to the external surface of the end wall portion of the closed hollow body. The piston 4 with such a closed hollow construction is advantageous in that the same is bouyant and thereby friction between the lower circumferential surface thereof and the inner circumferential surface of the cylinder 1 can be decreased. Accordingly, the flow meter can be further improved in its sensitivity.

A non-contact type detecting means 5 operable by eddy current is provided on the inner surface of the closure member 2 so as to face the end plate 4b of the foregoing piston 4, and is connected to a signal convertor (not shown).

The closure members 2, 3 are provided at their respective peripheral portions with fluid inlet and outlet openings 8, 9 which are in communication with a front chamber 6 and a rear chamber 7 of the cylinder 1 partitioned by the free piston 4.

The inlet and outlet opening 8 on the front chamber 6 side is connected through a pipe 10 to a supply source of fluid to be measured (a tank through a pump, for instance), and the inlet and outlet opening 9 on the rear chamber 7 side is connected through a pipe 11 to a surge tank or the like.

The fluid in-flow and outflow pipes 10, 11 are interconnected through a bypass 12 which is in parallel with the cylinder 1, and a four port connection valve 13 is provided in the bypass 12.

Figure 2:
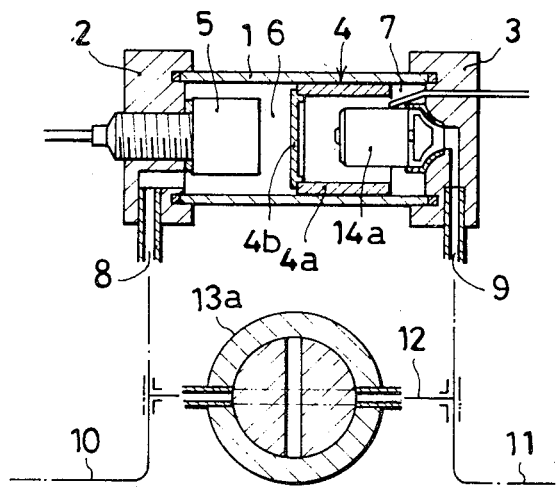
FIG. 2 is a sectional side view of a second embodiment of this invention.
Figure 3:
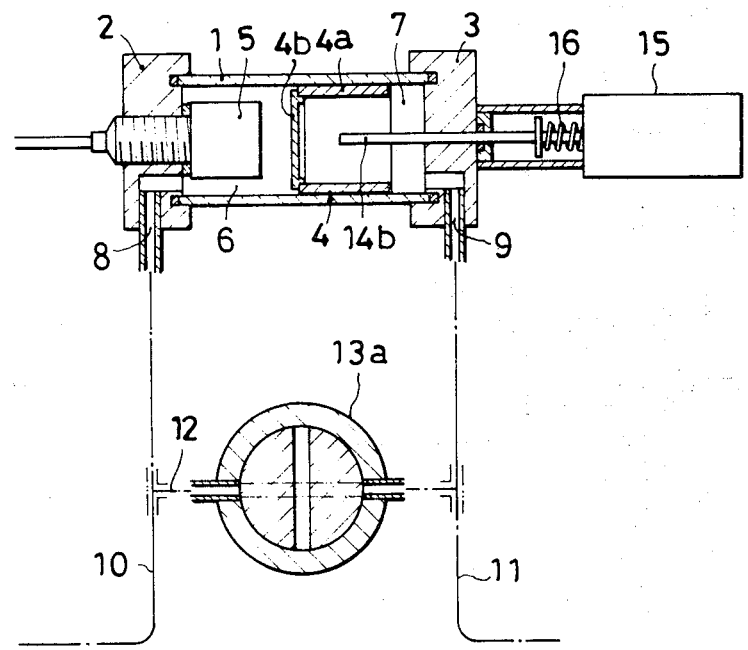
FIG. 3 is a sectional side view of a third embodiment of this invention.

In place of the four port connection valve 13, an opening and closing valve 13a used in examples as shown in FIG. 2 or 3 may be interposed in the bypass 12.

In the example shown in FIG. 1, a forcibly returning means for the piston 4 comprises a pump 14, which is interposed in the foregoing bypass 12 between the valve 13 and pipe 10 via a pipe 20. In another example shown in FIG. 2, the forcibly returning means comprises an immersion pump 14a provided in the rear chamber 7 of the cylinder 1, and this arrangement is effective for making the flow meter small-sized by utilizing a dead space in the cylinder.

If, under the condition that the four port connection valve 13 is set in the position shown by solid lines in FIG. 1, fluid is supplied into the cylinder 1, the fluid flows into the front chamber 6 of the cylinder 1 through the pipe 10 and causes the free piston 4 to advance, and in the meanwhile, fluid previously contained in the rear chamber 7 of the cylinder 1 is pushed out by the advancing piston 4 and flows into the pipe 11 through the four port connecting valve 13.

A voltage generated at the detecting means 5 rises according as the piston 4 is advanced, and thus the raised voltage can be considered as a displacement amount of the piston 2. Accordingly, the flow rate can be obtained from the displacement amount of the piston 4 and the time taken for the displacement.

If the piston 4 is moved to reach the advancing end and the measuring ends, the four port connection valve 13 is changed over counterclockwise to the position shown by chain lines in the same Figure and the pump 14 is operated, whereby the fluid is forcibly flowed into the rear chamber 7, in the opposite flowing direction at the time of measuring, and simultaneously the fluid in the front chamber 6 is drawn out, whereby the piston 4 is returned to its original position.

During this returning operation, the pipes 10, 11 are connected one another through the bypass 12 and the valve 13, so that a main current of the fluid continues to flow, though a flow of diverged current thereof through the cylinder 1 is interrupted.

The four port connection valve 13 and the pump 14 may be synchronously operated and synchronously stopped by using high and low values of the output voltage of the detecting means 5 as respective control signals.

Similarly, to the relation between the pump 14 and the valve 13 in the example of FIG. 1, the immersion pump 14a also in the example of FIG. 2 may be operated and stopped synchronously with a changeover operation of the valve 13a.

In another example shown in FIG. 3, the forcibly returning means comprises a piston push rod 14b arranged to be driven by an electromagnetic type linear reciprocating motion machine 15. At the time of measuring, the push rod is retreated against the action of a compression coil spring 16 as illustrated, and when the piston 4 reaches the advanced end, the electromagnetic type linear reciprocating motion machine 15 is de-energized synchronously with the opening of the bypass 12 caused by a changeover operation of the opening and closing valve 13a, whereby the push rod 14b is extended by expansion of the spring 16 and pushes back the piston 4. Such a modification can be considered that the foregoing linear reciprocating motion machine 15 can have an air pressure cylinder or an oil pressure cylinder as a power source thereof.

Figure 4:
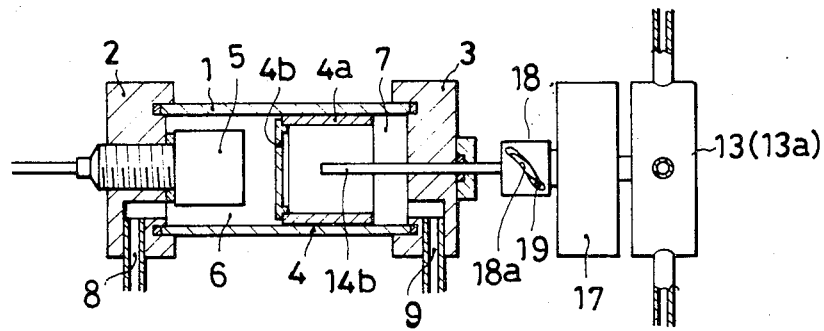
FIG. 4 is a sectional side view of a fourth embodiment of this invention.

In another example shown in FIG. 4, the piston push rod 14b is driven by a rotary reciprocating motion machine 17 which is a rotary solenoid, a rotary cylinder, or the like. A cylindrical cam 18 has a cam groove 18a for converting a rotary movement into a linear movement. A pin 19 on the rear end of the push rod 14b is in engagement with the cam groove 18a.

Further, in the example shown in FIG. 4, a shaft of the machine 17 and an operation shaft of the valve 13 or 13a are interconnected directly one with another so that the two members may operate together in such a manner that when the valve 13 or 13a is in its closed position, that is, at the time of flow rate measuring, the piston push rod 14b is advanced and when the valve 13 or 13a is in its open position, the push rod 14b is extended to push back the piston.

Thus, according to this invention, in the free piston type flow meter using the non-contact type detecting means, there is provided the bypass 12 connecting between the fluid in-flow and outflow pipes 10, 11 connected to the opposite end portions of the cylinder 1, and there is additionally provided such a forcible returning means 14 (14a, 14b) for returning the piston 4 to its original position that is arranged to be operated simultaneously with opening of the bypass 12 after the completion of the advancing stroke at the piston 4. In this manner, the piston 4 can be returned to its measuring starting position immediately after the completion of measuring of the flow rate. Thus, the measuring efficiency can be improved in comparison with that of a conventional device wherein the piston is returned only by a flowing force of the fluid caused by switching the supply direction of the fluid in relation to the cylinder between the front and the rear. Additionally, the fluid flow is not given any external disturbance, and the sensitivity is improved.

Any of the foregoing examples of this invention flow meter can be modified as shown in FIGS. 7 and 8. Namely, the fluid inflow and outflow pipes 10, 11 can be provided with respective swelled chamber 21, 22 formed at the portions thereof. With this arrangement, the fluid current flowing through each pipe is lowered in its flow rate at the interior of each chamber 21 or 22. Consequently, dust or particles contained in the fluid drop by gravity and also bubbles contained therein rise to the surface to be separated from the fluid. In this manner, dust or bubbles which might be introduced into the cylinder can be eliminated and the cylinder 1 can be always kept clean, whereby the piston 4 can operate smoothly, resulting in improvement in the sensitivity thereof.

An obstruction plate 23 is provided in each chamber 21, 22 so as to face the flowing direction of the fluid, and a bubble removing plug 24 is provided at the top and a dust removing plug 25 is provided at the bottom. The obstruction plate 23 is fixed by a stay not illustrated.

FIGS. 9 and 10 show another modified example of this invention flow meter. In this example, the non-contact type detecting means 5 is provided on each end of the cylinder 1 so as to face the member 4b to be detected on each end surface of the piston 4, and the two detecting means 5, 5 are so arranged that a metering signal may be obtained by a composition of their outputs generated simultaneously. Thus, the detecting sensitivity in relation to the displacement of the piston is amplified, so that a good sensitivity can be obtained even if the displacement amount and the displacement speed of the piston are small in relation to the diameter thereof. Accordingly, this arrangement is especially suitable for the flow meter for measuring a very small flow rate requiring a high sensitivity.

It is readily apparent that the above-described slow flow flow meter meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A flow meter of the type that a displacement amount of a free piston resulting from the same being moved in a cylinder by supplying fluid thereinto is detected by a non-contact type detecting means to measure a flow rate of the fluid, characterized in that there is provided a bypass connecting between fluid inflow and outflow pipes which are connected to both end portions of the cylinder; and there is additionally provided a source of fluid to be measured and a separate forcible returning means for returning the free piston to its original position operated simultaneously with opening of the foregoing bypass after the completion of an advancing stroke of the free piston, said forcible returning means comprising a pump interposed in the bypass; and in that the free piston is constructed by a combination of a nonconducting material tubular body and a conductive material end plate closing at least one end opening of the tubular body.

2. A flow meter of claim 1, wherein the conductive material end plate is combined with the end opening of the nonconducting material tubular body by mounting the same under presssure therein or bonding thereto.

3. A flow meter of claim 1, wherein the free piston is a closed hollow one.

4. A flow meter of claim 1, wherein each of the fluid inflow and outflow pipes is provided with a swelled chamber midway of the same.

* * * * *